(12) United States Patent
Hiracheta et al.

(10) Patent No.: US 10,399,029 B1
(45) Date of Patent: Sep. 3, 2019

(54) DUAL PHASE SAND AND WATER SEPARATOR SYSTEM AND METHOD OF USE

(71) Applicants: Kealin Chase Hiracheta, New Home, TX (US); Thomas Jason Rich, Midland, TX (US)

(72) Inventors: Kealin Chase Hiracheta, New Home, TX (US); Thomas Jason Rich, Midland, TX (US)

( * ) Notice: Subject to any disclaimer, the term of this patent is extended or adjusted under 35 U.S.C. 154(b) by 0 days.

(21) Appl. No.: 15/488,443

(22) Filed: Apr. 15, 2017

Related U.S. Application Data

(60) Provisional application No. 62/322,988, filed on Apr. 15, 2016.

(51) Int. Cl.
| | |
|---|---|
| *B01D 19/00* | (2006.01) |
| *B01D 45/02* | (2006.01) |
| *B01D 46/10* | (2006.01) |
| *B01D 17/00* | (2006.01) |
| *B01D 36/04* | (2006.01) |
| *B01D 36/00* | (2006.01) |
| *B01D 36/02* | (2006.01) |
| *B01D 21/24* | (2006.01) |
| *B01D 45/08* | (2006.01) |
| *E21B 43/34* | (2006.01) |

(52) U.S. Cl.
CPC ............ *B01D 46/10* (2013.01); *B01D 17/00* (2013.01); *B01D 19/0042* (2013.01); *B01D 21/2461* (2013.01); *B01D 36/00* (2013.01); *B01D 36/02* (2013.01); *B01D 36/04* (2013.01); *B01D 45/02* (2013.01); *B01D 45/08* (2013.01); *E21B 43/34* (2013.01)

(58) Field of Classification Search
CPC . E21B 43/34; B01D 19/0042; B01D 21/2461; B01D 45/02; B01D 45/04; B01D 45/08
USPC ....... 210/188, 241, 523, 532.1, 539; 96/182, 96/183; 166/75.12
See application file for complete search history.

(56) References Cited

U.S. PATENT DOCUMENTS

| | | | | |
|---|---|---|---|---|
| 3,789,583 | A * | 2/1974 | Smith | B01D 19/0042 96/182 |
| 4,247,312 | A * | 1/1981 | Thakur | B01D 21/2461 96/215 |
| 4,707,277 | A * | 11/1987 | Mims | B01D 21/245 210/241 |
| 5,811,016 | A * | 9/1998 | Zierler | B01D 21/2461 210/523 |
| 5,900,137 | A * | 5/1999 | Homan | B01D 21/245 210/241 |
| 8,313,658 | B2 * | 11/2012 | Cnossen | B01D 21/245 210/532.1 |
| 8,623,221 | B1 * | 1/2014 | Boyd | E21B 43/34 166/75.12 |
| 2007/0075024 | A1 * | 4/2007 | Campbell | B01D 21/2461 210/521 |

(Continued)

*Primary Examiner* — Christopher Upton
(74) *Attorney, Agent, or Firm* — Eldredge Law Firm, LLC; Richard Eldredge (57) ABSTRACT

A dual phase separator system that receives waste material from an oil well and removes gas, oil or the like from the other waste materials. The system has two separators, one that feeds into another. One of the separators having an auger screw to facilitate the separation of the waste material.

2 Claims, 6 Drawing Sheets

(56) References Cited

U.S. PATENT DOCUMENTS

2013/0186622 A1* 7/2013 Thompson .............. E21B 43/34
166/75.12

* cited by examiner

DUAL PHASE SAND AND WATER SEPARATOR SYSTEM AND METHOD OF USE

BACKGROUND

1. Field of the Invention

The present invention relates generally to sand, water, and gas separators and methods of use.

2. Description of Related Art

Figure 1:
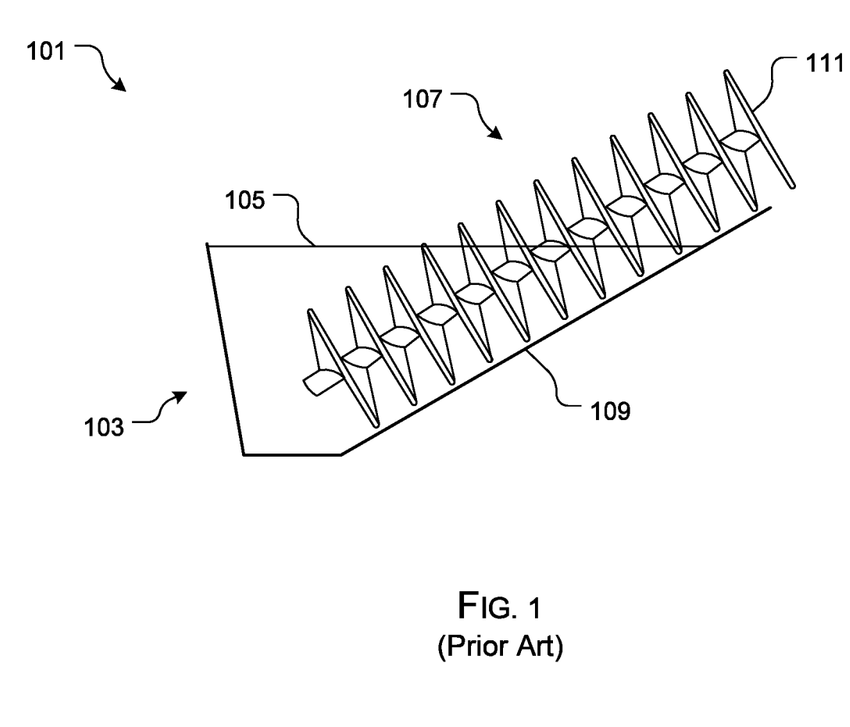
FIG. 1 is a side view of a conventional separator.

Separators configured to separate sand from water are well known in the art and are effective means to remove sand and/or other debris from a liquid. For example, FIG. 1 illustrates a front view of a conventional separators 101 having a housing 103 configured to receive a mix of sand and water 105 therein. An auger screw 107 is partially disposed within the sand and water mix and has a plurality of blades 111 configured to traverses the sand and water mix along an inclined section 109 of housing 103. During use, the auger screw 107 rotates, which in turn causes an upward angled movement of the sand and water mix along the inclined section 109. The water gradually recedes along the inclined section while the sand and/or other forms of debris exits from housing 103 via auger screw 107.

It will be appreciated that the separator 101 is effective in most scenarios; however, the separator 101 has limitations. For example, the separator 101 is not effective in separating small, fine materials from the sand and water mix 105. The separator 101 is primarily utilized to remove larger sized particles.

Accordingly, although great strides have been made in the area of separator systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the separator system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the separator system and method of use of the present application are provided below. It will of course be appreciated that in the development of any actual embodiment, numerous implementation-specific decisions will be made to achieve the developer's specific goals, such as compliance with Separator system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The separator system and method of use will be understood, both as to its structure and operation, from the accompanying drawings, taken in conjunction with the accompanying description. Several embodiments of the Separator system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-6 depict various views of the dual-phase separator system 201 in accordance with a preferred embodiment of the present application. It will be appreciated that the system 201 overcomes one or more of the above-listed problems commonly associated with the conventional separators. Detailed explanation of these differences and unique features of the system 201 are discussed below with reference to the accompanying drawings.

System 201 includes one or more of a portable trailer 200 having a body 203 with a front end 205, a bottom 207, a top 209, and a back end 211. Secured to the front end 205 is a hitch 213 configured to engage with a hitch system of a vehicle (not shown). One of more wheels assemblies 215 are attached to the back end of the body 203 and provide effective means for transport.

One of the unique features believed characteristic of the present application is the use of a first separator 217 in fluid communication with a second separator 202. The second separator 202 includes a hopper bin 219 that receives the fluid and material from first separator 217. Separator 202 is further provided with an auger screw 223 that moves the fluid and material along an elevated surface 221 to a location outside the system. In the contemplated embodiment, the fine material screw within the frac tank and a two phase separator on top of the frac tank has the option of operating both vertically and horizontally.

System 201 is further provided with a gas combustor 225 fixedly attached to top 209 and operably associated with the first and second separators. An optional variable frequency drive control system 227 and a power cord 229 are also contemplated in the preferred embodiment and are rigidly attached to the back end of the body. A manhole 231, preferably 24 inches in diameter extends inwardly from an outer surface of the body 203 and provides access to the hopper 219.

Figure 3:
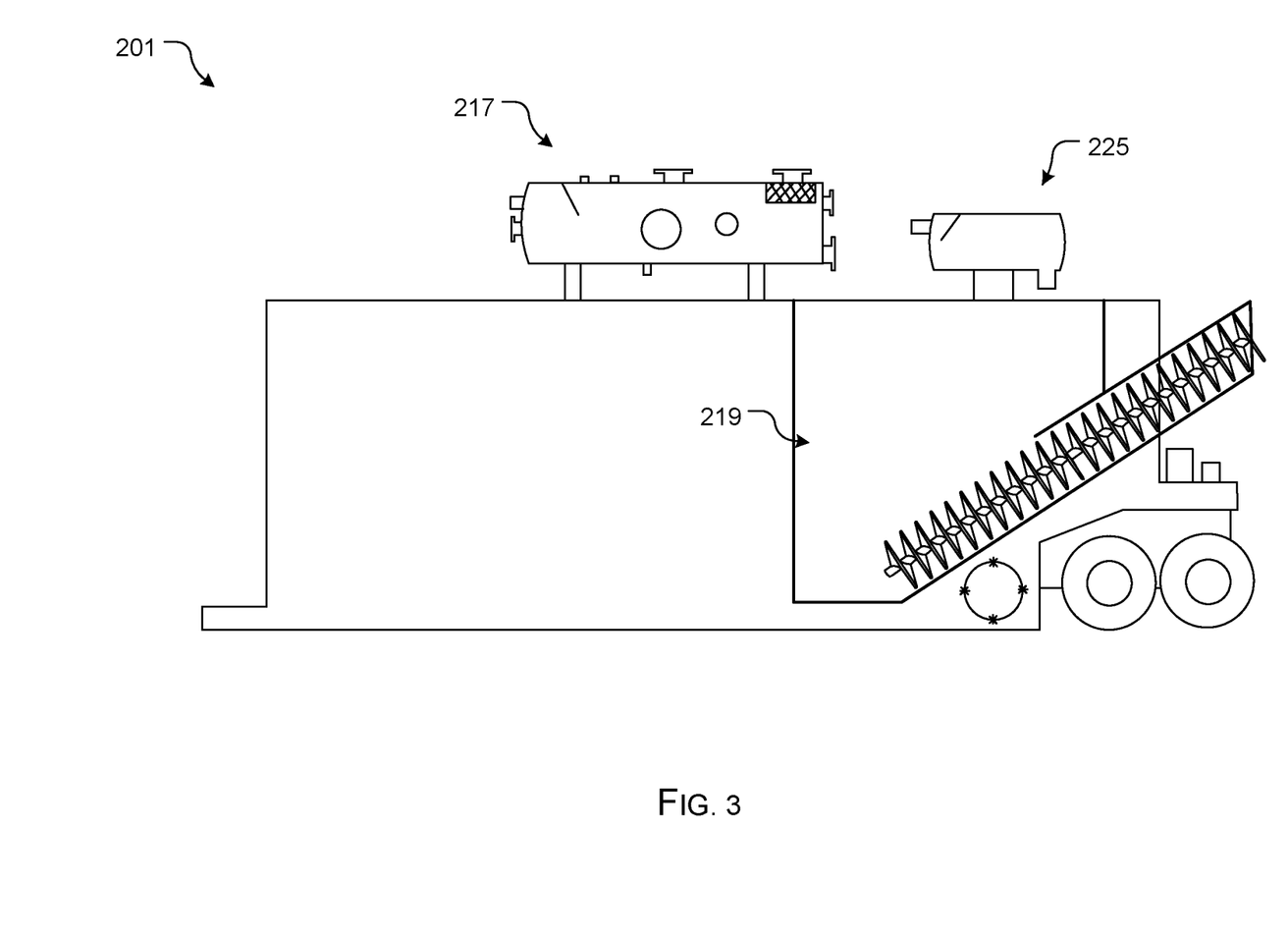

FIG. 3 illustrates the general movement of the fluid and material as it passes through the separators and through the system. As depicted, the fluid and material first passes through the first separator and then through the second separator prior to leaving the system.

Figure 4:
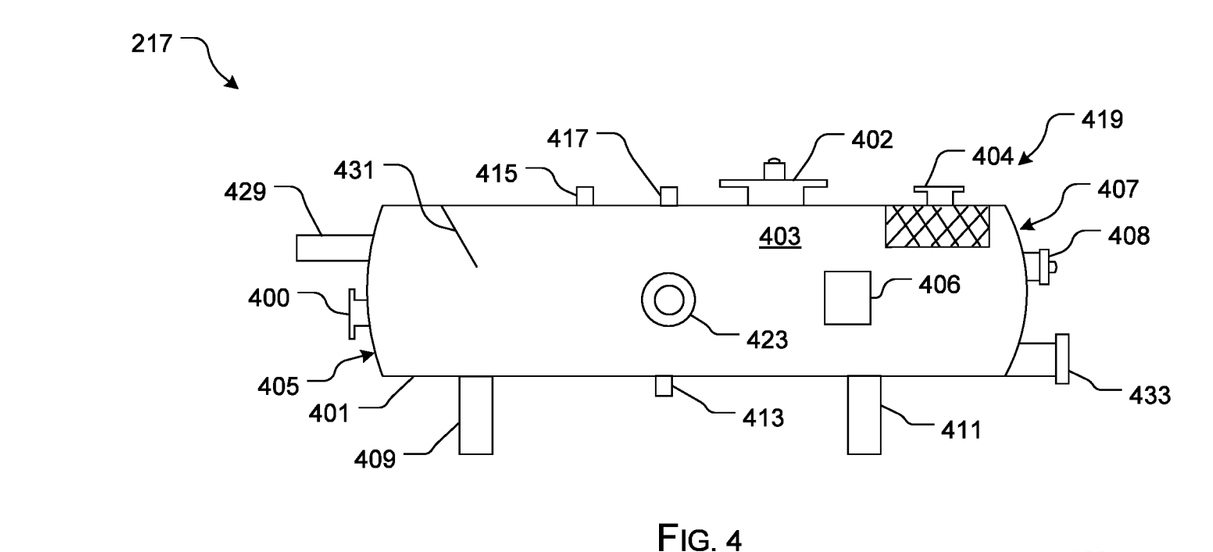
FIG. 4 is a side view of the separator of FIG. 2 during use.
Figure 5:
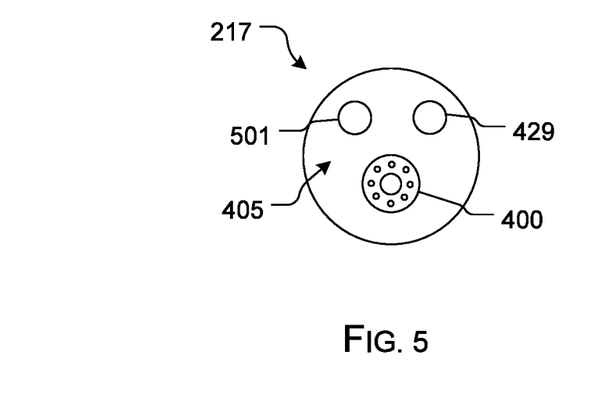
FIG. 5 is a back view of the separator of FIG. 4 during use.
Figure 6:
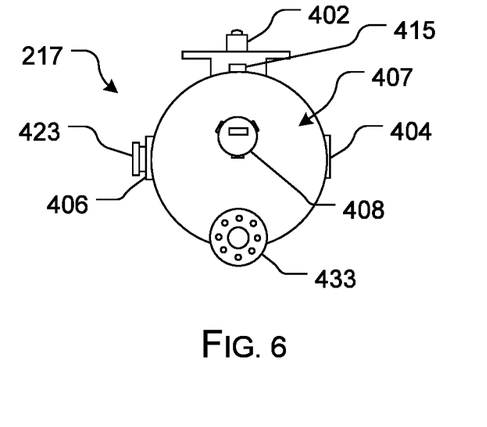
FIG. 6 is a front view of the separator system of FIG. 5 during use.

Referring now to FIGS. 4-6, respective side, front, and back views of the first separator 217 are shown. In the illustrative embodiment, separator 217 includes an elongated tubular body 401 forming an inner cavity to receive the fluid and material therein. The body 401 is further provided with a front surface 405, a back surface 407 and a side outer surface 403. During use, fluid falls from the separator 217 into a hopper bin 219_baffle plate section where sand and guild start to separate and flow under the baffle plate to the calming pool where it will continue to settle and allow the sand to travel up the sand screw to dewater.

A plurality of footings 409, 411 fixedly attach to surface 403 and are configured to secure the separator 217 to the top 209. A dump valve 413 in fluid communication with the inner cavity of body 401 extends from surface 403 and provides communication means to the inner cavity during use. A pressure gauge 415, preferably 50 psi, is secured to surface 403 and provides the user visual inspection of the pressure within the inner cavity. A pop off valve 417 is also rigidly attached to surface 403 and in fluid communication with the inner cavity. A mist extractor 419 is positioned at one end of the body 401 and is in fluid communication with the inner cavity.

A man cover 423, preferably 24 inches in diameter, provides access to the inner cavity. Finally, inlet conduits 429, 501 are secured to front surface 405 and provide fluid communication with the inner cavity. A plate inlet diverter 431 is used to divert the fluid and gas entering into inner cavity from the inlet conduits.

Separator 217 is further provided with an inlet 400 extending from surface 405 and an inlet 402 extending from outer surface 403. Two plates 404, 406 are utilized on surface 403 and extend therefrom. An outlet 408 extends from surface 407 and provides access to the inner area of the body.

In the preferred embodiment, the outlet 433 has an opening that is relatively flush with the bottom surface of the tank body. This feature enables a more efficient sand and gas separation and so the sand disposed within the body will have a better flow dynamic. During use, the fluid does not pass throughout the second separator after passing through the first separator incase the first separator malfunctions. It should be understood that separator 217 is configured to separate gas from the fluid before it flows into the hopper of the sand screw and that the first and second separators function separate from each other.

Figure 2:
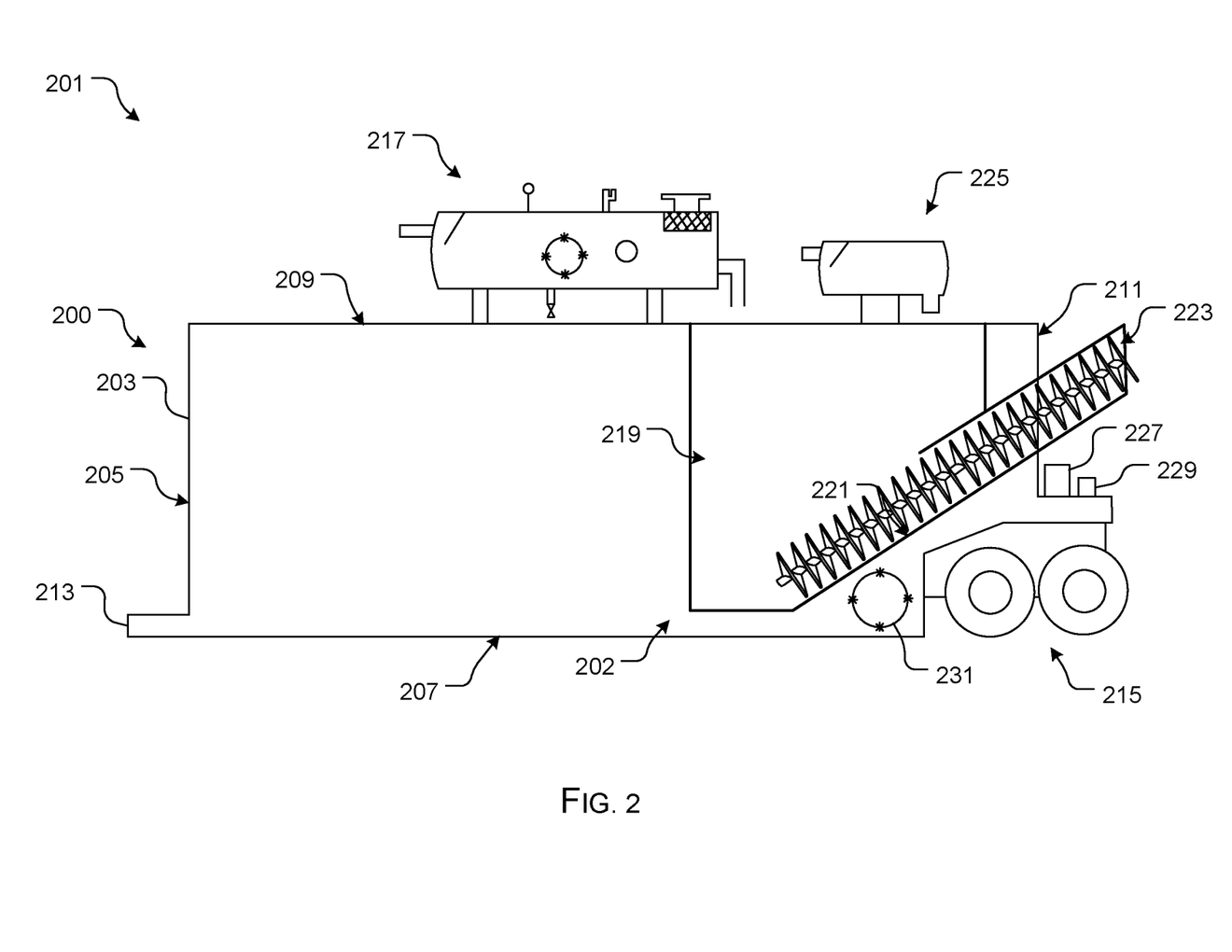
FIGS. 2 and 3 are side views of a separator system in accordance with a preferred embodiment of the present application.
Figure 7:
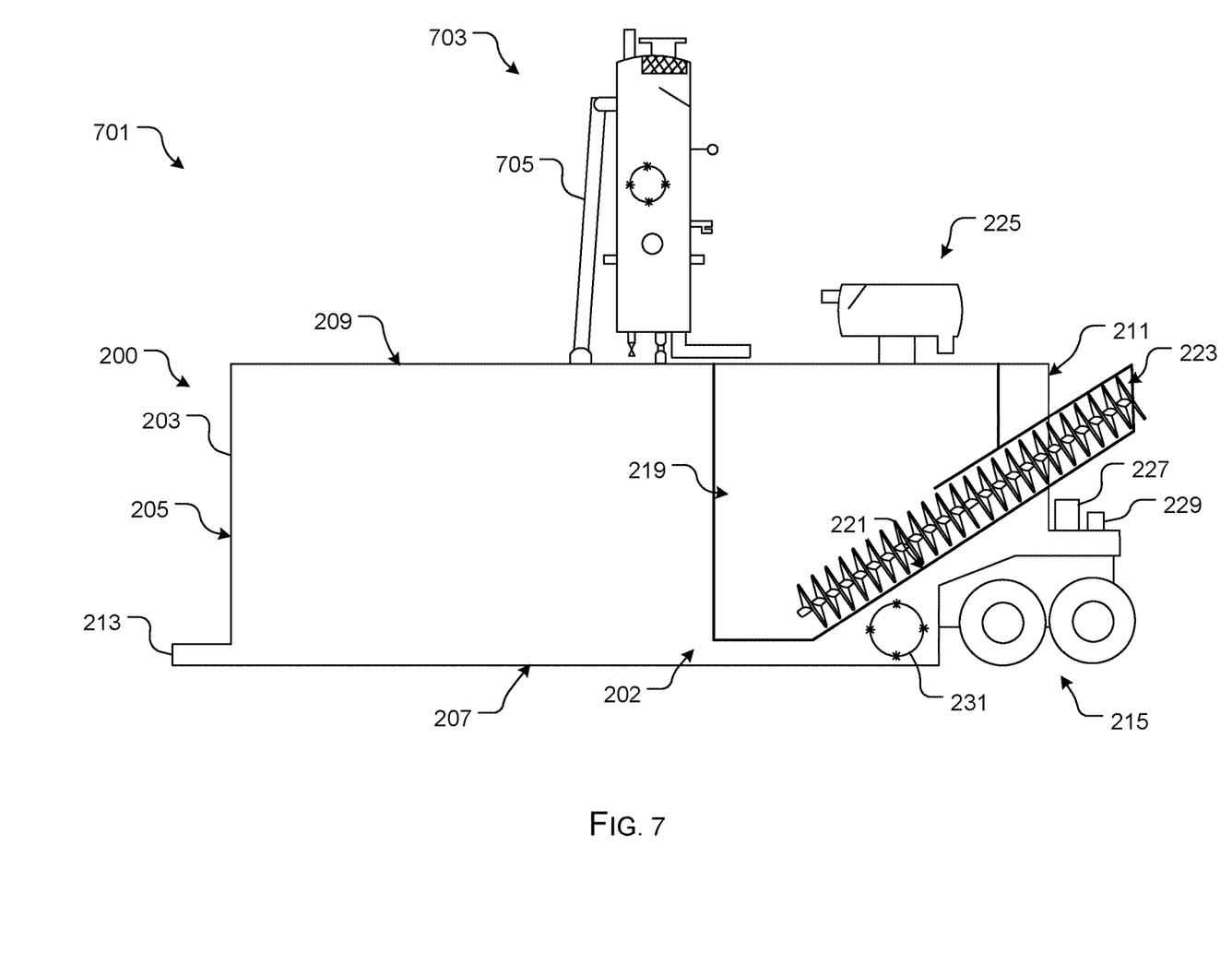
FIG. 7 is a side view of an alternative embodiment of the system of FIG. 2.
Figure 8:
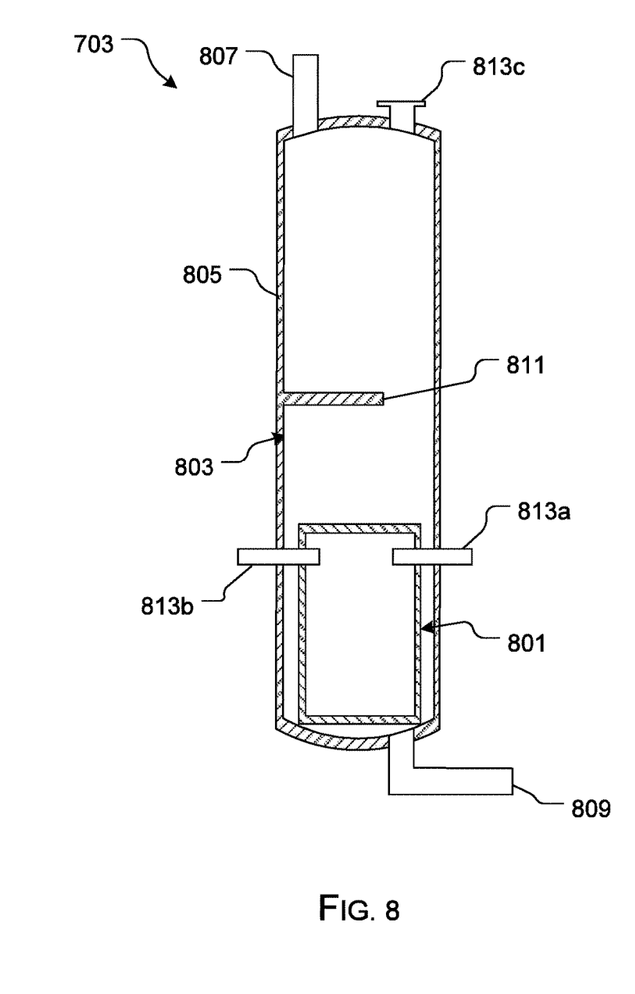
FIG. 8 is a cross-sectional side view of the separator for FIG. 7.

Referring now to FIG. 7 an alternative embodiment of the stem of FIG. 2 is depicted. Embodiment 701 contains similar elements as system 201, with a vertical separator 703. The separator 703 is raised and lowered by a hydraulic arm 705. The separator 703 having a box 801 within the inner cavity 803 as depicted in FIG. 8. The inner cavity 803 enclosed by an elongated body 805. The separated material exits thought a port 809 on the bottom of the elongated body 805. Captured natural gasses exit through a low pressure valve 807 at the top. The inner cavity also having a diverter plate 811 attached near the midpoint to control the flow of the material and facilitate gas removal. The separator 703 having a plurality of inlets 813 arranged to introduce new material to be processed.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A separator system comprising:
   a portable trailer having a hitch near the front end and a plurality of wheels to enable transport of the trailer;
   a first separator having a body attached to the top of the trailer that accepts waste material and removes gas from the material, the first separator having a diverter plate extending from an inside surface of the body into an interior area of the body and one or more inlet conduits;
   the first separator configured to drop the material into a second separator comprising a hopper bin within an inner cavity of the portable trailer;
   the diverter plate diverts fluid and gas entering the interior area from the one or more inlet conduits to facilitate gas removal;
   a hydraulic arm secured to the first separator, the hydraulic arm is pivotally attached to the portable trailer and configured to elevate the first separator from a horizontal position to a vertical position relative to the portable trailer;
   and
   an auger screw that removes material from the second separator along an elevated surface;
   wherein material is cleaned and prepared for disposal.

2. A separator system comprising:
   a portable trailer having a hitch near the front end and plurality of wheels to enable transport of the trailer;
   a vertical separator having a body attached to the top of the trailer that accepts waste material and removes gas from the material, the vertical separator having a diverter plate extending from an inside surface of the body into an interior area of the body and one or more inlet conduits;
   the vertical separator configured to drop the material into a second separator comprising a hopper bin within an inner cavity of the portable trailer;
   the diverter plate diverts fluid and gas entering the interior area from the one or more inlet conduits to facilitate gas removal;
   a hydraulic arm secured to the vertical separator, the hydraulic arm is pivotally attached to the portable trailer and configured to elevate the vertical separator from a horizontal position to a vertical position relative to the portable trailer;
and
an auger screw that removes material from the second separator;
wherein material is cleaned and prepared for disposal.

* * * * *